US006916427B2

(12) United States Patent
Roth

(10) Patent No.: US 6,916,427 B2
(45) Date of Patent: Jul. 12, 2005

(54) ELECTROCHEMICAL METHOD FOR TREATING WASTEWATER

(75) Inventor: William Jeffrey Roth, Lehigh Acres, FL (US)

(73) Assignee: Ira E Whitlock, Chattanooga, TN (US)

( * ) Notice: Subject to any disclaimer, the term of this patent is extended or adjusted under 35 U.S.C. 154(b) by 199 days.

(21) Appl. No.: 10/138,874

(22) Filed: May 3, 2002

(65) Prior Publication Data

US 2003/0205535 A1 Nov. 6, 2003

(51) Int. Cl.[7] .............................. C02F 1/48; C02F 1/72
(52) U.S. Cl. ...................... 210/709; 210/717; 210/721; 210/748; 210/908; 205/742
(58) Field of Search .................... 210/702, 709, 210/716, 717, 721, 739, 743, 746, 748, 758–760, 765, 192, 908; 204/269, 175, 176, 674; 205/742

(56) References Cited

U.S. PATENT DOCUMENTS

| | | | | |
|---|---|---|---|---|
| 3,664,951 A | * | 5/1972 | Armstrong | 210/707 |
| 4,163,716 A | * | 8/1979 | Turnbull | 210/665 |
| 4,379,082 A | * | 4/1983 | Gauchon | 588/18 |
| 5,728,287 A | * | 3/1998 | Hough et al. | 205/743 |
| 5,868,941 A | * | 2/1999 | Gillham et al. | 210/747 |
| 5,948,273 A | * | 9/1999 | Yoshida et al. | 210/748 |
| 6,346,197 B1 | * | 2/2002 | Stephenson et al. | 210/704 |

FOREIGN PATENT DOCUMENTS

WO    WO 01/60751 A1 * 8/2001

* cited by examiner

Primary Examiner—Frank M. Lawrence
(74) Attorney, Agent, or Firm—Wenver H. Schroeber

(57) ABSTRACT

A method of purifying wastewater as a fluent coming either from industrial plants or from municipal sewage runs. The method includes the steps of running the wastewater as a fluent into a headworks where some preliminary treatment takes place. From there the fluent is passed into a primary reservoir. The primary reservoir analyzes the fluent as to certain control parameters such as pH, dissolved oxygen and/or dissolved solids. Thereafter the fluent flows into a primary reactor having a plurality of electrolytic cells therein. While in that reactor the fluent is subjected to electrical contacts which are located at the bottom and the top of the reactor. The effluent from the primary reactor passes through a ratio weir into a secondary receptor. The secondary receptor contains sensors for the measurement of control parameters such as pH, DO (dissolved oxygen TDS (total dissolved solids) and chlorine. Thereafter, the fluent is passed to a filtering device. The overall purification system can be termed an electrolytic chemical system.

23 Claims, 4 Drawing Sheets

ELECTROCHEMICAL METHOD FOR TREATING WASTEWATER

CROSS REFERENCE TO RELATED APPLICATIONS

None

STATEMENT REGARDING FED SPONSORED R & D

None

BACKGROUND OF THE INVENTION

The use of water by the world's population for personal residential use as well as commercial and industrial uses of water is increasing. Regulations to control the quality of water returned to the environment have been instituted to limit the degree of environmental pollution. Due to the increasing use of water and regulations for controlling the quality of water returned to the environment, water treatment systems continue to grow in importance.

RELATED ART

Conventional wastewater treatment processes that treat municipal wastewater generally use processes that require a significant amount of time to complete. These time consuming processes include the physical process of settling where suspended solids float to the surface or settle to the bottom of a settling tank and the biological process where dissolved and colloidal solids are biodegraded by microorganisms and are converted to sludge and scum. Due to the long time duration of these processes, the tanks in which they occur must be sufficiently large to meet the water treatment production requirements. For example, for a facility that has a total production process time of 12 hours, and a production requirement of 100,000 gallons per day, the approximate aggregate tank capacity within the facility needs to be 50,000 gallons. However, a treatment process that has a total process time of 30 minutes can produce the same amount of treated water with a total approximate aggregate tank capacity of 2,100 gallons. Large facility requirements are costly in land use, construction and maintenance. It is therefore desirable to have a process for treating wastewater that has a process time that is short in duration.

The biological processes used by conventional wastewater treatment facilities require continuous aeration to provide the microorganisms which biodegrade the dissolved and suspended colloidal solids the air needed to sustain their life. The aeration of the large tanks involved requires costly installation and maintenance of large aeration and re-circulation pumps and substantial electrical power to operate. The aeration of large tanks also creates the production of offensive odors that must commonly be controlled. Controlling such odors requires the costly installation and maintenance of significant air handling mechanisms and air scrubbers which require substantial power to operate. Treatment processes which require aeration of large tanks therefore result in a high cost of construction, maintenance and operation. It is therefore desirable to have a process for treating wastewater which does not require aeration of large tanks to maintain living microorganisms.

Conventional wastewater treatment processes that treat municipal wastewater generally use some chemical processes such as chlorine to disinfect and otherwise treat the water. Chlorine is commonly used in the form of chlorine gas which is very hazardous to store and handle. It is further desirable to have a process that does not require chlorine gas additives to disinfect.

DESCRIPTION OF THE PRIOR ART

U.S. Pat. No. 4,179,347 describes a continuous system for disinfecting water. A wastewater stream is passed into an electrolytic cell open to the atmosphere and between a series of electrically charged parallel electrode plates. A controlled amount of electrolyte such as sodium chloride is added to the wastewater stream before it passes through the electrolytic cell. A portion of the treated water from the electrolytic cell is recycled and re-injected into the influent stream.

U.S. Pat. No. 5,948,273 illustrates a water purification process which comprises applying electrical energy to water to be treated in a treatment chamber having a cathode and an anode opposing each other. The anode and/or the water in the vicinity of the anode is vibrated and debris inside and outside the chamber is removed.

Of particular relevance are the following patents to Mehl because of the use of electrolysis in their system.

U.S. Pat. No. 3,340,175 to C. W. Mehl discloses an apparatus for purifying water wherein the wastewater is electrolytically treated by moving sewage between a series of plates located from 0.4 to 0.7 inches from each other while a rectified one-half wave ten to sixty cycles per second alternating current having a small reverse current is applied to the first and last plates of the series. The inventive concept does not use a series of plates and does not employ alternating current.

U.S. Pat. No. 3,523,891 to R. C. Mehl illustrates a two-stage sewage treatment process including a first electrolytic cell for producing a metal hydroxide floc on electrolysis and an ozone unit for bubbling ozone upwardly through the cell and floating the floc on top of the fluid. A vacuum blower communicates with the cell for removing the floc and the entrapped solids. A second stage cell having a pair of horizontally mounted electrodes for further producing a metal hydroxide floc may be included for further removing suspended solids. In contrast to this disclosure, the inventive method at hand uses a first stage electrochemical process for producing metal hydroxide floc and a second stage electrochemical process for oxidation. Said first stage and second stage electrochemical processes are separated by a process to remove solids formed and coagulated in the first electrochemical process. The inventive concept does not have a multiple of rectangular electrode plates as will be described below.

There is also known the systems provided by "Hydroxyl Systems' of B.C. Canada. One such Hydroxyl system is merely designed to be used in marine applications. This system consists of four major components such as (a) a primary screening, (b) primary solids separation/oxidation tank, (c) secondary oxidation/disinfection tank and (d) controls and oxidant generation equipment. The process includes primary solids separation, the removal of suspended solids, oil and grease as well as Biochemical-Oxygen-Demand (BOD) reduction. The Hydroxyl systems use various methods of oxidation. The marine system uses a separate oxidant generator which then feeds into influent. Hydroxyl hazardous waste systems show separate $O_3$ and $H_2O_2$ generators that feed directly into the influent stream. These latter two systems, marine and hazardous, appear to be differentiated from the inventive concept in that they use separate generators for oxidation rather than oxidizing the stream directly. Hydroxyl wastewater treatment systems utilize biological reactors. None of the above references teach the use of an electrochemical process for the treatment of wastewater similar to that of the present invention.

SUMMARY OF THE INVENTION

The wastewater treatment stages are as follows:

Stage one: coagulation, absorption and conversion of soluble compounds to insoluble compounds. By means of an electrolytic reactor cell, granular bipolar electrodes are decomposed to form metal hydroxide in solution. The granular electrodes used in the reactor bed are bipolar in nature and are equally potentialized to maximize their consumption. Electrode materials are selected and blended for use in the reactor bed in proportion to the expected reactions required to coagulate the colloidal solids.

Stage two: A solids separation process is used to separate solids coagulated in stage one from the fluent. Solids separation can be accomplished using a continuous backwash sand filter, Dissolved Air Flotation (DAF) system or other conventional processes to effect separation of the solids.

Stage three: The fluent having solids substantially removed in stage two, then passes through a third stage electrochemical reactor cell. The granular electrodes in this cell are stable, that is, non-corrosive. The purpose of the reactions within this cell is to produce oxidative species that react with remaining dissolved solids. These oxidative species consist of nascent oxygen, ozone and peroxide in varying proportions. Chlorine is also formed in proportion to the chlorine salts present in the waste stream.

Stage four: A conventional polishing filter is used to remove particles as small as one micron. The particles filtered in this stage consist of debris generated by the oxidation reactions in stage three.

Stage five: Injected ozone in this stage and contact with ultra violet light accomplish a sterilization. Final effluent is re-circulated within the reservoir to maintain a high rate pathogen kill.

OBJECTS OF THE INVENTION

It is an object of the invention to provide a new electrochemical process and apparatus which can be realized in a relatively small floor surface area.

It is another object of the present invention to provide a new electrochemical process and apparatus which may be easily and effectively manufactured and marketed being fabricated from readily available materials.

It is a further object of the present invention to provide a new electrochemical method and apparatus which consumes a relatively small amount of power.

Still another object of the invention is to provide a new electrochemical process and apparatus which requires minimal maintenance over its entire useful life.

It is also an object of the present invention to provide a new liquid reactor cell for causing impurities within a fluid to coagulate and form larger particles which then may be more easily separated by subsequent separation processes.

It is a further object of the present invention to provide a new liquid reactor cell which is of a durable and reliable construction.

It is another object of the present invention to provide a new liquid reactor cell which operates effectively under varying fluid flow conditions.

It is another object of the present invention to provide a new liquid reactor cell which automatically replenishes electrodes consumed in the reactor cell.

DETAILED DESCRIPTION OF THE INVENTION

Figure 1:
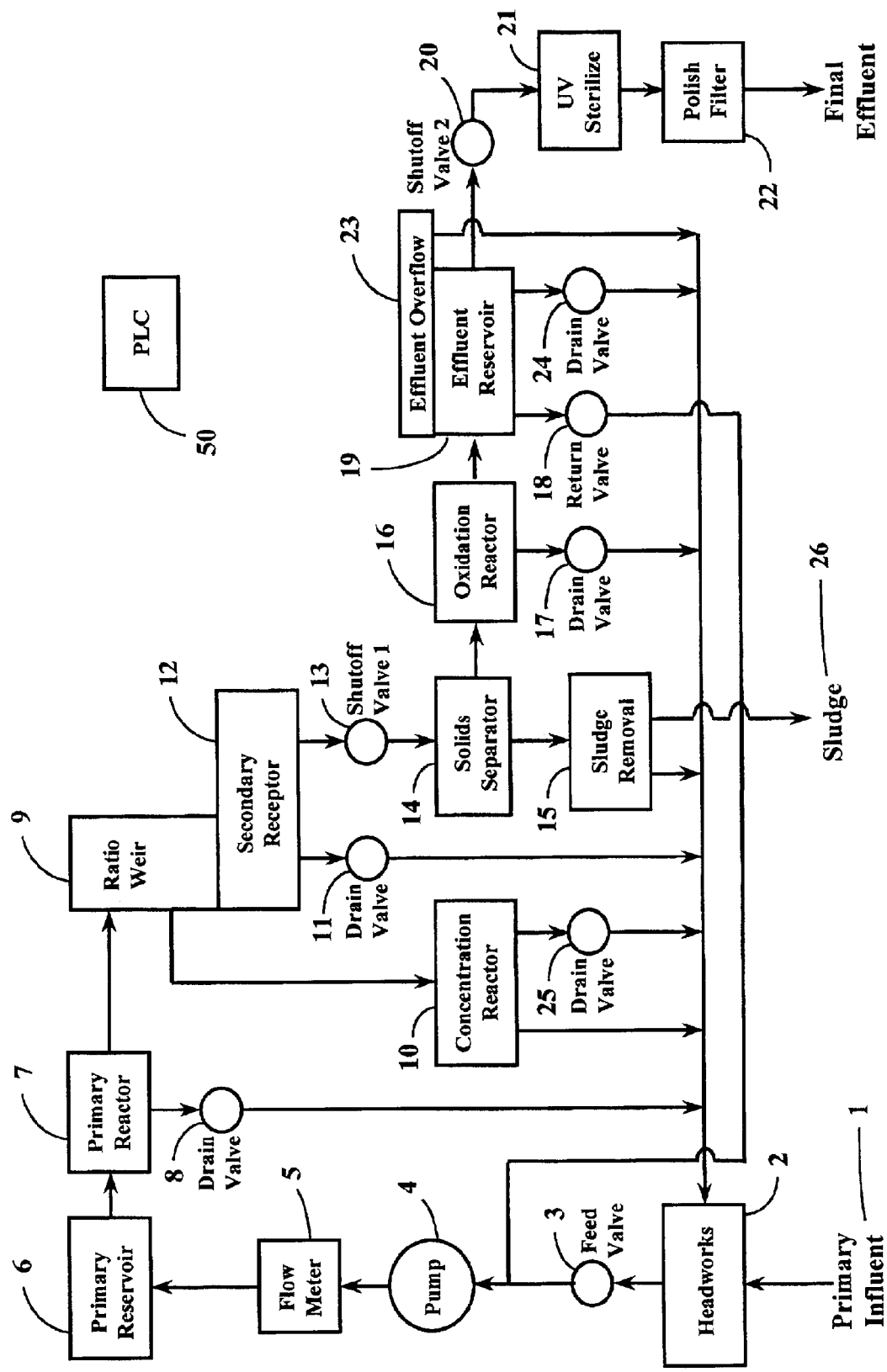
FIG. 1 is a flow diagram of the overall process.

In this specification, the following nomenclature will be used with reference to the wastewater or sewage that is being treated. An 'Influent", whether it is primary or secondary, is the fluid to be treated as it enters any of the treatment system components. 'Effluent" is the fluid as it exits any of the components. "Fluent" is the fluid that is within any one of the components. In this respect, in FIG. 1 the numeral 1 is the primary influent that enters the headworks 2 to be treated therein by removing solids. The headworks grinds, washes, de-waters and discharges the solids from the fluent within the headworks 2. Screens within the headworks 2 only allow solids which are less than a maximum size to pass through the headworks 2 and to flow downstream to pump 4 by way of a feed valve 3. The headworks 2 are commonly available, such as the 'Auger Monster', manufactured by JWC Environmental headquartered in Costa Mesa, Calif.

For treating wastewater having a high sand and grit content, it may be desirable to include a degritter after the headworks 2 to capture sand and grit not removed by the headworks 2. Sand and grit can create accelerated wear in system components such as pumps and valves. Sand and grit will also tend to settle and collect in areas where the fluent flow slows such as in a primary reservoir. Degritters are commonly available such as those manufactured by Grande, Novae and Associates, Inc. having headquarters in Montreal, Canada.

Pump 4 is a centrifugal pump having a variable speed drive. The variable speed drive allows for control of the rate of flow of the fluent as measured and determined by the flow meter 5. Centrifugal pumps are desirable as they are simple to maintain and repair. Pump 4 is commonly available, such as the model 3080.211/311 manufactured by ITT Flygt headquartered in Stockholm Sweden.

Flow meter 5 measures the rate of flow of the influent. A magnetic flow meter such as those manufactured by Krone or Isco can be used. The flow meter 5 can be located near the influent or the effluent point of pump 4 depending on which is more convenient for installation. However, it needs to be located such that it receives influent having negligible turbulence so as not to cause inaccurate flow measurements. This location will generally be at a minimum distance from pump 4 equal to several multiples of the interconnecting pipe's diameter and will generally be specified by the meter's manufacturer.

The fluent is moved by the pump 4 to a primary reservoir 6. This reservoir 6 is used to slow the influent for analysis. Sensor probes are used to measure the control parameters such as the pH and conductivity. The primary reservoir 6 also serves to maintain the energy required to move the fluent through the balance of the system. This can be accomplished by either constructing the primary reservoir as a sealed tank to maintain the pressure generated by pump 4 or to construct the primary reservoir as an open tank and to elevate said tank to maintain gravitational energy generated by the Pump 4.

The fluent flows from the primary reservoir 6 to a primary reactor 7. Primary reactor 7 is comprised of one or more of vertically oriented reactor cells 29. The reactor cells are shown in more detail in FIG. 2. Said vertical orientation refers to the vertical and upward flow of fluent through the cells. Each primary or electrolytic reactor cell 29 receives fluent from the primary reservoir 6 at the cell 29 bottom. The fluent travels upwardly through the electrolyzed mixed media bed 32 that consists of expendable blended bipolar granular electrodes 34 and non-conductive granular electrode spacers 33 of similar size and densities. The non-conductive granular electrode spacers 33 serve to provide some separation between the bipolar granular electrodes 34 to limit electrical shorting between the electrodes within the cell 29. The interior of the cell body is stacked with porous spheres 38 designed to trap oxygen bubbles and to stabilize the mixed media 32 during fluidization. As the fluent travels upward through the electrolyzed mixed media it becomes fluidized. This action prevents the system from clogging with debris and helps to move the mixed media 32 within the cell 29 for uniform decomposition. The bipolar granular electrodes 34 consist of conductive and potentially non-conductive materials that are co-extruded and cut into granules for use in the cells 29 of reactor 7. For municipal wastewater treatment, the conductive material consists of aluminum and a lesser component of iron, but can be varied in composition to suit specific contaminants being treated. During the electrolytic process the conductive component of the bipolar electrodes 34 breaks down (decomposes) to form metal hydroxide. For the non-conductive component of the electrode, carbon can be utilized to absorb volatile organic compounds (VOC). The carbon is consumed by abrasion. The rate of consumption is adjusted to be similar to that of the conductive component by varying the hardness of the carbon. Similarly, the non-conductive spacers 33 consist of carbon to additionally absorb volatile organic compounds (VOC). The carbon comprising the non-conductive spacers 33 is consumed by abrasion. The rate of consumption is adjusted to be similar to that of the bipolar electrodes 34 by varying the hardness of the carbon. Metallic hydroxide, carbon and other solids are later removed from the fluent in solids separator 14. There is a drain valve 8 below the primary reactor 7 in drain fluids from the reactor whenever necessary. Such fluids are returned to the headworks 2.

Figure 2:
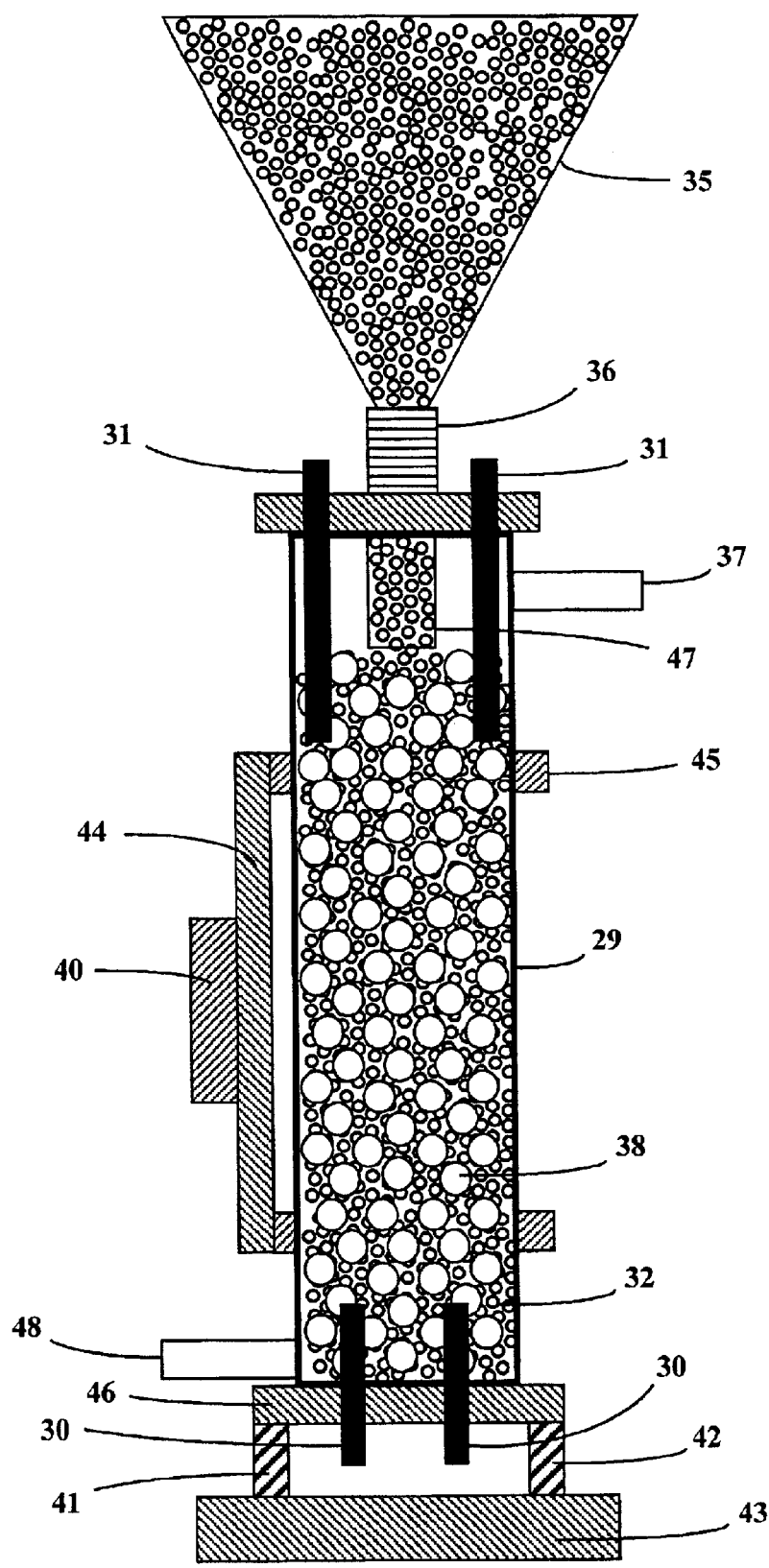
FIG. 2 shows the structure of an electrolytic reactor cell.
Figure 3:
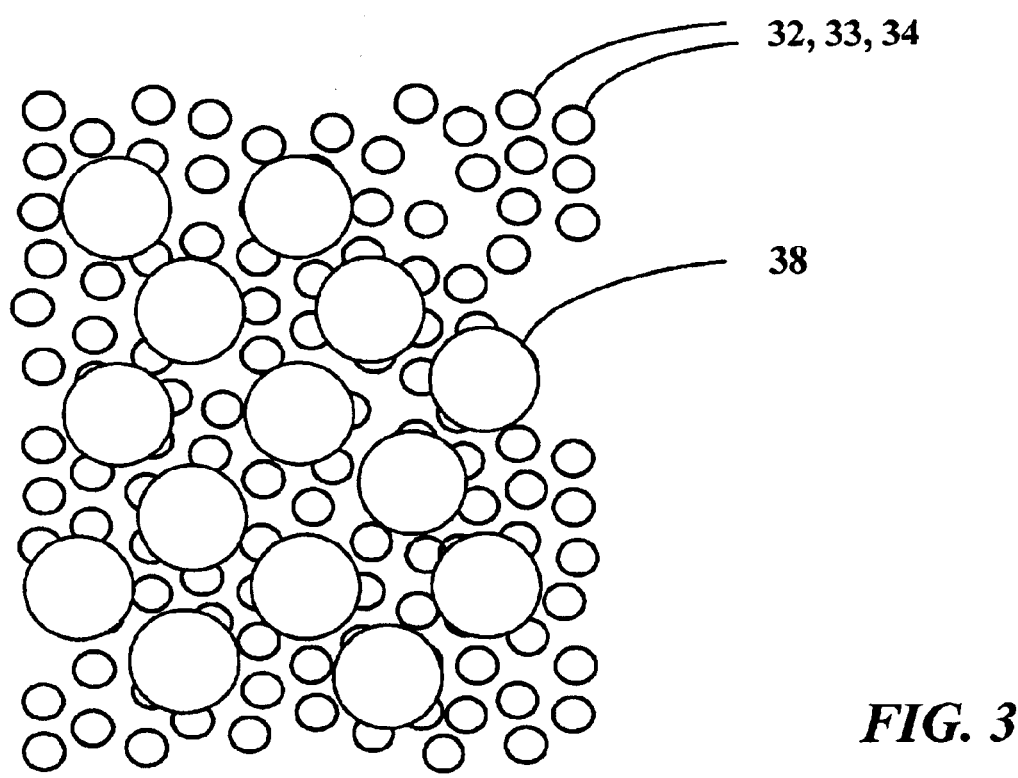
FIG. 3 shows the mixed media in the reactor in an enlarged view.

To produce the electrolytic process, an electrical current is applied to flow between stationary contacts 30 and 31 situated at opposite ends of the of the primary reactor cell 29 in FIG. 2. The stationary contacts 30 and 31 are in contact with the fluidized media bed 32. The electrical current produces an electrolytic reaction that decomposes the conductive component of the bipolar granular electrodes 34 into metal hydroxide. Current to the primary reactor 7 is adjusted by the Programmable Logic Controller (PLC) 50 to optimize the production of metal hydroxide through the decomposition of the bipolar electrodes 34. The metal hydroxide produced in the primary reactor 7 serves as a flocculating agent that coagulates the suspended and colloidal solids thereby making it possible to remove by subsequent filtration or other separation processes.

Polarity of the stationary contacts 30 and 31 is periodically reversed to aid in the cleansing of the stationary contacts. Polarities to the bipolar granular electrodes 34 in the media bed 32 are reversed automatically as the position of these loose electrodes change due the action within the fluidized bed.

Periodically, the cell, or cells if more than one, are vibrated to loosen the media and abrasively remove deposits on the stationary contacts 30 and 31. This action also keeps the media bed from clogging with debris. Furthermore, the vibration abrasively decomposes the carbon component of the bipolar granular electrode 34 and the carbon based non-conductive spacers 33. Vibration may be accomplished by several means such as pneumatic, hydraulic, ultrasound or electromagnetic. To this end in FIG. 2 there is shown a solid bass 46. On this solid base the shell 29 of the primary reactor is supported on rubber blocks 41 and 42. The vibrator 40 is schematically shown at 40. It is supported on a vertical block 44 having clamps 45 mounted thereon where said clamps surround the shell 29. Therefore, if the vibrator 40 is operated, the shell 29 of the primary reactor can follow the vibratory movements because of the elastic mounts 41 and 42.

Granular mixed media is automatically replaced in the cell, or cells if more than one, as it is consumed. A hopper 35 is attached at the top of each cell by way of a flexible coupling 36. During the vibration cycle mixed media 32 is moved into the cell 29 to replace the media consumed during the electrolytic process.

Figure 4:
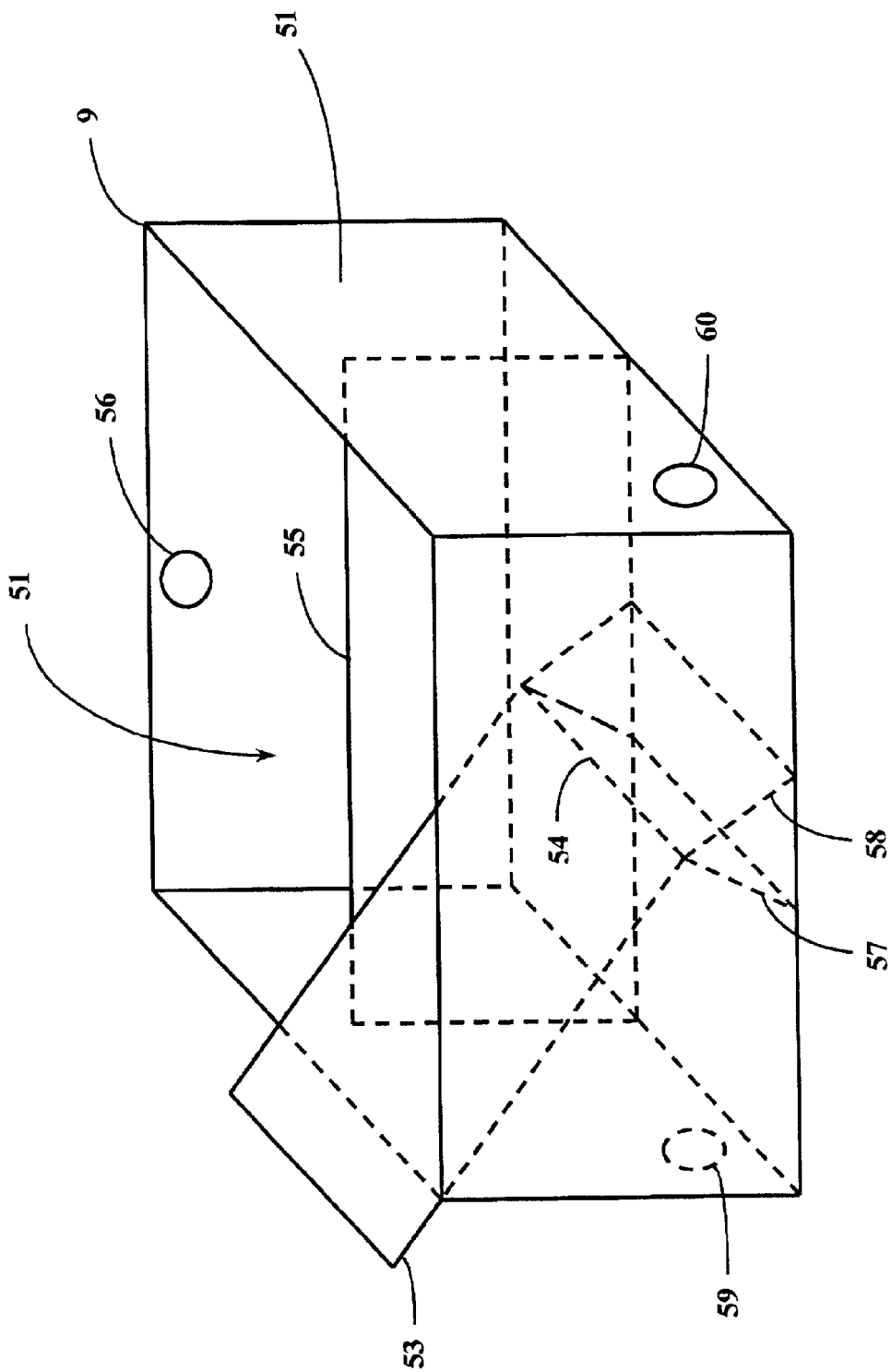
FIG. 4 shows a schematic of how the ratio weir operates.

Effluent from the primary reactor 7 passes to the secondary receptor 12 through a ratio weir 9. The ratio weir 9 as shown in FIG. 4 is constructed as a trough 51 which has an adjustable mechanism 53 to split the flow of influent into two portions of effluent flows having an adjustable ratio of proportions. Influent 56 into the ratio weir 9 travels through the trough 51 towards the weir 55. As the influent 56 moves through the trough 51, most of the turbulence in the fluent subsides and the flow becomes relatively laminar. The adjustable divider 53 splits the fluent flow as it passes over the weir 55. The resultant two fluent streams spill over weir 55 and encounter the opposing gradient dividers 57 and 58 and flow towards their respective outlets 59 and 60. Gradient dividers 57 and 58 rigidly meet at their top most surfaces to which a hinge 54 connects the adjustable divider 53. Adjustable divider 53 can pivot about hinge 54 and move from side to side to vary the ratio of portions of effluent flows 59 and 60. Ratio weir 9 sends a portion of the fluent from the primary reactor 7 (5% to 25%) to the concentration reactor 10. Concentration reactor 10 has a reactor cell identical in construction to the primary reactor 7. Electrical current to the concentration reactor 10 is adjusted by the PLC 50 to highly treat the fluent to create an excess of metal hydroxide and oxidative species. Alternatively to simplify the control and electrical power equipment, the electrical current to the concentration reactor 10 can be a set ratio of the current to the primary reactor 7. Fluent from the concentration reactor 10 is returned to the headworks 2 where its excess metal hydroxides and oxidative species serve to precondition or pre-treat the primary influent 1. Pre-treating helps to improve the primary reactor's 7 efficiency allowing for an increase of fluent flow through the system by initiating the reduction and flocculation of dissolved and suspended particles in the fluent stream prior to entering the primary reactor 7. Odor is significantly reduced by oxidation resulting from the highly treated fluent delivered from the concentration reactor 10. A drain valve 25 is included in a line to drain the concentration reactor completely of fluent and return the fluent back to the headworks if so desired.

The major portion of effluent from the primary reactor 7 (75% to 95%) passes through the ratio weir 9 to the secondary receptor 12. The secondary receptor 12 contains sensors for the measurement of control parameters pH, total suspended solids (TSS) and conductivity. The secondary receptor 12 is of a size that results in an average fluent dwell time of several minutes within the receptor 12. This several minute dwell time provides additional reaction time for flocculation and oxidation of suspended and dissolved solids before entering the solids separator 14. A shutoff valve 13 has been interposed between the secondary receptor 12 and the solids separator 14.

Effluent from the secondary receptor 12 flows to a solids separator 14. Solids separator 14 can be of any process which effectively separates the coagulated solids from the fluent. Two preferable processes for separating solids are a continuous backwash gravity sand filter such as those manufactured by Applied Process Technology, Inc., having its headquarters in Conroe, Tex., or a Dissolved Air Flotation (DAF) system such as those manufactured by Pan American Environmental, having headquarters in Schaumburg, Ill. In a continuous backwash gravity filter the influent to the sand filter enters at the top and gravitates down through layers of increasingly finer sand. Solids captured in the filter beds are drawn downward with the sand into an airlift pump. The turbulent, upward flow in the airlift provides a scrubbing action that effectively separates the sand and the solids before discharging into a filter wash box. The regenerated sand is returned to the top of the filter and the reject solids, now in the form of sludge are sent to sludge removal 15 for disposal.

In a DAF system, fluent which has been saturated under pressure with air, is released into the bottom of a DAF tank. As air-saturated fluent enters the tank microscopic bubbles of air are released due to a drop in pressure. The microscopic air bubbles attach themselves to solids in the fluent and cause the solids to float to the top of the DAF tank. Skimmers then remove the floating solids which are now in the form of sludge which is sent to sludge removal 15 for disposal.

Clean fluent from the solids separator 14 is sent to the second stage oxidation reactor 16. The second stage oxidation reactor 16 consists of one or more electrolytic cells 29. These cells are substantially similar in construction as the cell in primary reactor 7 with the exception that the mixed media 32 consists of stable non-corrosive conductive materials and non-abrading non-conductive materials. Therefore the mixed media 32 used in oxidation reactor 16 does not decompose. Accordingly, the cells 29 (FIG. 2) in the oxidation reactor 16 are not equipped with hoppers for replenishment as none of the media is consumed. Work performed by the action of electrolysis is used to generate oxidative species such as nascent oxygen, ozone and peroxides. Electrical current to the oxidation reactor is adjusted by the PLC 50 to optimize the production of the oxidative species. The accelerated oxidation which takes place in the oxidation reactor 16 further reduces total dissolved solids (TDS), biological oxygen demand (BOD), and chemical oxygen demand (COD) and other contaminants that lend themselves to oxidation reactions. A byproduct of electrolytic process in the oxidation reactor 16 is the production of chlorine from the salts present in the fluent. If additional chlorine is required to maintain required residual levels, a saline brine solution can be added to the fluent prior to the primary reactor 7. The addition of salt to the system will also increase the overall efficiency of the system by improving the conductivity within the reactors 7, 12 and 16.

Effluent from the oxidation reactor 10 flows to the effluent reservoir 19. Effluent reservoir 19 is an open tank reservoir having a shutoff valve 20 to allow or restrict discharge of fluent. Effluent reservoir 19 is also used to slow the fluent for analysis. Sensor probes are used to measure the control parameters of pH, dissolved oxygen (DO), TSS and chlorine that are measured to determine if the fluent meets regulation for discharge. If the fluent is determined to meet regulations, the fluent has been sufficiently treated and the shutoff valve 20 remains open thereby discharging the fluent. Sufficiently treated effluent that is discharged from the effluent reservoir 19 may optionally be further treated by means of ultraviolet light 21 and a polish filter 22. If the fluent in effluent reservoir 19 is determined not to meet regulations, the fluent is not sufficiently treated and the shutoff valve 20 is closed. When shutoff valve 20 is closed the fluent overflows through the effluent overflow system in combination with the effluent reservoir 19 and is returned to the headworks 2 for reprocessing. The effluent reservoir can be completely drained into a return line by opening the drain valve 24 if so required.

Sludge removal 16 receives discharged sludge from solids separator 14. Sludge removal can be accomplished by a variety of systems commonly used for sludge removal such as the use of a sludge press, belt press, centrifuge or filter press to first remove much of the yet present water in the sludge resulting in a de-watered sludge. The wastewater extracted by these processes is returned by the solids separator 14 to the headworks 2 for treatment. The de-watered sludge can then be removed by truck, such as a dump truck. Alternatively, the sludge can be dumped directly into a tanker truck and removed without de-watering.

System control is provided by programmable logic controller (PLC) 50 which receives operator input and control parameter data from sensors and meters and controls the system operation based upon the operator input and control parameter data. PLC 50 is programmed to provide for startup sequences, shutdown sequences and the running of the wastewater treatment system. Two options for startup and shutdown sequences are described below. The first option is for systems which do not include a return valve 18 and feed valve 3. The second option is for systems that have a return valve 18 and a feed valve 3. While the addition of a return valve 18 and a feed valve 3 results in additional costs, these valves allow the system to operate a cleaning cycle whereby the PLC 50 shuts off fluent flow from the headworks 2 and provides a closed fluent loop by opening the return valve 18 and closing the feed valve 3. This closed fluent loop enables the system to continually treat and cycle the fluent throughout the closed system.

Option 1 System Start Up is Accomplished by the PLC 50 Performing the Following Steps:

1) Close shutoff valve 20;
2) Close shutoff valve 13;
3) Close drain valves 8, 11, 17, 24, 25;
4) Start pump 4 at preset flow;
5) Check if the fluent in the primary reactor 7 and the concentration reactor 10 are at sufficient levels. If so then proceed to step 6;
6) Turn on the current in the primary reactor 7 and the concentration reactor 10 to a preset value;
7) Check to see if the pH of the fluent entering the ratio weir 9 is within a preset range for a preset time. If so proceed to step 8;
8) Open shutoff valve 13;
9) Check to see if the fluent in oxidation reactor 16 is at a sufficient level. If so proceed to step 10;
10) Turn on current to oxidation reactor 16 to a preset value;
11) Check to see if the pH, CL, TSS and DO levels of the fluent in the effluent reservoir 19 meet requirements for discharge for a preset time. If so proceed to step 12;
12) Open shutoff valve 20.

Option 1 System Shutdown is Accomplished by the PLC 50 Performing the Following Steps:

1) Close shutoff valve 20;
2) Turn off current to the primary reactor 7, concentration reactor 10 and oxidation reactor 16;
3) Turn off the pump 4;
4) Open the drain valves 8, 11, 17, 24, 25.

Option 2 System Start up is Accomplished by the PLC 50 Performing the Following Steps:

1) Close shutoff valve 20;
2) Close shutoff valve 13;
3) Close return valve 18;
4) Close drain valves 8, 11, 17, 24, 25;
5) Open feed valve 3;
6) Start pump 4 at preset flow;
7) Check if the fluent in the primary reactor 7 and the concentration reactor 10 are at sufficient levels. If so then proceed to step 8;
8) Turn on the current in the primary reactor 7 and the concentration reactor 10 to a preset value;
9) Check to see if the pH of the fluent entering the ratio weir 9 is within a preset range for a preset time. If so proceed to step 10;
10) Open shutoff valve 13;
11) Check to see if the fluent in oxidation reactor 16 is at a sufficient level. If so proceed to step 12;
12) Turn on current to oxidation reactor 16 to a preset value;
13) Check to see if the pH, CL, TSS and DO levels of the fluent in the effluent reservoir 19 meet requirements for discharge for a preset time. If so proceed to step 14;
14) Open shutoff valve 20.

Option 2 System Shutdown is Accomplished by the PLC 50 Performing the Following Steps:

1) Close shutoff valve 20;
2) Open return valve 18;
3) Close feed valve 3;
4) Run pump 4 at a preset flow;
5) Set the currents in the primary reactor 7, concentration reactor 10 and oxidation reactor 16 to preset values;
6) Operate the system for an operator settable time period;
7) Turn off current to the primary reactor 7, concentration reactor 10 and oxidation reactor 16;
8) Turn off the pump 4;
9) Open the drain valves 8, 11, 17, 24, 25.

The above series of steps also serve as a cleaning cycle for the system.

Running the System is Accomplished by the PLC 50 Continually Performing the Following Steps:

1) Adjust the pump 4 speed to maintain a desired primary influent level or to a preset flow;
2) Adjust the current in the primary reactor 7 and concentration reactor 10 as a function of the flow rate and an operator entered pH set point for the fluent in the secondary receptor 12;
3) Adjust the current in the oxidation reactor 16 as a function of the flow rate and an operator entered DO set point for the fluent in the effluent reservoir 19;
4) Check to see if the pH, CL, TSS and DO levels of the fluent in the effluent reservoir 19 meet requirements for discharge. If the requirements are not met close shutoff valve 20. If the requirements are met open shutoff valve 20 after a preset time delay if it is closed;
5) Check to see if the pH level in the secondary receptor 12 is within an operator selected range. If it is not, begin the startup sequence or shutdown sequence based on an operator selectable value. If it is within the selected range proceed to step 6;
6) Vibrate the reactors 7, 10 and 16 based on an operator selectable time cycle for an operator selectable time duration.

In addition to the startup sequences, shutdown sequences and running of the wastewater treatment system, the PLC 50 can optionally control free CL levels in the final effluent and provide air injection to the primary reactor and concentration reactor.

Controlling the Free CL Level is Accomplished by the PLC 50 Continually Performing the Following Steps:

1) Check the free CL level of the fluent in the effluent reservoir 19 and the conductivity of the fluent in the primary reservoir 6;
2) Adjust the brine feed to the fluent as a function of the fluent flow, the conductivity of the fluent in the primary reservoir 6, the CL level in the effluent reservoir 19 and an operator entered set point for the CL level for the fluent in the effluent reservoir 19.

Some systems may optionally include a mechanism to periodically inject air into the base of the primary reactor 7 and concentration reactor 10. The resulting air flow though the reactor and media bed will serve to help remove debris in the reactor and media bed.

The Control Sequence for Injecting Air in the Primary Reactor 7 and Concentration Reactor 10 is Accomplished by the PLC 50 Performing the Following Steps:

1) After an operator entered time delay from the start of the vibration step (which is step 6 of the sequence for running the system) open the air feed valve to inject air into the base of the primary reactor 7 and concentration reactor 10;
2) After an operator entered time delay from the opening of the air feed valve, close the air feed valve.

The present invention can be used in conjunction with conventional wastewater treatment methods to increase capacity, reduce odor and provide a final stage for oxidation and disinfectant. Given the teachings of this invention, its application to conventional treatment systems will be apparent to those skilled in the art. For example, a conventional treatment system could utilize a primary reactor to treat fluent within a conventional physical settling tank or to pre-treat influent prior to a conventional physical settling tank. This would advantageously reduce odor and accelerate the settling action in the tank by providing oxidation and flocculating agents. In this configuration, the primary reactor would be connected to the settling tank or a holding tank situated prior to the settling tank. A circulation pump would circulate fluent from the settling tank or holding tank through the primary reactor. Furthermore, this method of treatment for use in a conventional treatment method could also include a ratio weir and concentration reactor, where said ratio weir directs the major portion of the effluent from the primary reactor to the settling tank or holding tank and directs the smaller portion to the concentration reactor. The effluent from the concentration reactor is then sent to the headworks thereby providing odor control and beginning a flocculation process within the headworks. All of the above can be accomplished without departing from the scope of the invention.

What I claim is:

1. A method for treating wastewater comprising the steps of:
   passing said wastewater through a first electrolytic reactor to generate a flocculating agent to coagulate solids disposed in said wastewatar,
   thereafter separating coagulated solids from said wastewater,
   thereafter passing said wastewater through a second electrolytic reactor to oxidize organic compounds residual in said wastewater.
   wherein said first electrolytic reactor utilizes bipolar granular electrodes,
   wherein said bipolar granular electrodes are automatically replaced when consumed.

2. The method of claim 1 including the step of measuring the flow of said wastewater between said first reactor and said second reactor.

3. The method of claim 1 wherein said second electrolytic reactor utilizes bipolar granular electrodes.

4. The method of claim 3 wherein said bipolar granular electrodes are stable non-corrosive materials.

5. The method of claim 1 including the step of analyzing control parameters between said first and said second reactors.

6. The method of claim 5 wherein said control parameters include pH TSS and conductivity.

7. The method of claim 1 including the step of vibrating said first electrolytic reactor and said second electrolytic reactor to loosen debris lodged therein.

8. The method of claim 1 including the step of applying a current to control points in said first and said second reactors.

9. The method of claim 8 including the step of reversing the polarity of said current applied to said contact points.

10. The method of claim 1 including the step of measuring control parameters after said second reactor.

11. The method of claim 10 wherein said control parameters are pH, DO, TSS and chlorine.

12. A method of pro-treating wastewater to reduce odor and improve the coagulation of solids comprising the steps of:
   passing wastewater from a headworks through a first electrolytic reactor to generate a flocculating agent to coagulate solids disposed in the wastewater and to generate an oxidizing agent,
   thereafter passing a portion of said wastewater through a second electrolytic concentration reactor to generate concentrated levels of flocculating and oxidizing agent,
   thereafter returning the wastewater containing said concentrated levels of flocculating oxidizing agents to said headworks thereby pretreating the wastewater influent
   wherein said first electrolytic reactor and said second electrolytic concentration reactors utilize bipolar granular electrodes,
   wherein said bipolar granular electrodes are automatically replaced when consumed.

13. The method of claim 12 including the step of passing said fluent into a ratio weir.

14. The method of claim 13 wherein said ratio weir directs a major portion of the fluent from the primary reactor to a tank having a fluent dwell time.

15. The method of claim 14 wherein said dwell time allows for continued flocculation and oxidation.

16. The method of claim 13 wherein said ratio weir directs a smaller portion of said fluent back to said second electrolytic concentration reactor.

17. A method of treating a wastewatar fluent by oxidation and controlling a discharge of effluent based on parameters determining the quality of the effluent comprising the steps of:
   passing fluent through an electrolytic reactor to generate oxidizing agents,
   thereafter measuring parameters determining the quality of said fluent,
   thereafter operating a valve to cause discharge, or continued treatment based on the determined quality of the fluent
   wherein said electrolytic reactor utilizes bipolar granular electrodes and
   wherein said bipolar electrodes are stable non-corrosive materials.

18. A method of treating wastewater comprising the steps of:
   depositing the wastewater as an influent into a headwork tank,
   thereafter pumping the fluent as in influent into a primary reservoir,
   and thereafter into a primary electrolytic reactor having at least one electrolytic cell therein,
   while the fluent is passing through said electrolytic cell applying an electric current to stationary contacts and periodically vibrating said cell,
   thereafter passing said fluent as an influent into a ratio weir which sends a portion of said influent in said ratio weir from said primary reactor to a concentration reactor and thereafter returning said portion of said fluent from said concentration reactor back as influent to said headworks,
   thereafter reducing odor of said fluent in said headworks by oxidation created by said fluent from said concentration reactor,
   passing the remaining portion of said influent to said ratio weir to a secondary receptor,
   analyzing certain control parameters in said fluent while passing through said secondary receptor,
   from said secondary reactor said fluent flows to a filter,
   clean water from said filter flows from said filter to a second stage oxidation reactor.

19. The method of claim 18 where said primary reactor and said concentration reactor utilize bipolar granular electrodes.

20. The method of claim 19 where said bipolar granular electrodes are automatically replaced when consumed.

21. The method of claim 18 where said second stage oxidation reactor utilizes bipolar granular electrodes.

22. The method of claim 21 where said bipolar granular electrodes are stable non-corrosive materials.

23. A method of treating fluent in a conventional wastewater treatment system for reducing odor and accelerating settling in a settling tank, the improvement comprising: circulating fluent from a fluent tank situated prior to said setting tank through a primary electrolytic reactor and back to said settling tank, wherein said primary reactor utilizes bipolar granular electrodes and wherein said bipolar granular electrodes are automatically replaced when consumed.

* * * * *